US008364900B2

(12) United States Patent
Caprioli et al.

(10) Patent No.: US 8,364,900 B2
(45) Date of Patent: Jan. 29, 2013

(54) PSEUDO-LRU CACHE LINE REPLACEMENT FOR A HIGH-SPEED CACHE

(75) Inventors: Paul Caprioli, Santa Clara, CA (US); Sherman H. Yip, San Francisco, CA (US); Shailender Chaudhry, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1028 days.

(21) Appl. No.: 12/029,889

(22) Filed: Feb. 12, 2008

(65) Prior Publication Data

US 2009/0204761 A1   Aug. 13, 2009

(51) Int. Cl.
*G06F 12/00* (2006.01)
(52) U.S. Cl. ....................................................... 711/136
(58) Field of Classification Search ................... 711/136
See application file for complete search history.

(56) References Cited

U.S. PATENT DOCUMENTS

| | | | |
|---|---|---|---|
| 6,931,493 B2* | 8/2005 | Johns et al. | 711/136 |
| 2004/0123035 A1* | 6/2004 | Gilbert | 711/128 |
| 2007/0233964 A1* | 10/2007 | Robinson | 711/136 |

OTHER PUBLICATIONS

Caprioli, Paul et al., U.S. Appl. No. 11/155,147, entitled Circuitry and Method for Accessing an Associative Cache, filed Jun. 16, 2005.

* cited by examiner

*Primary Examiner* — Matthew Bradley
(74) *Attorney, Agent, or Firm* — Park, Vaughan, Fleming & Dowler LLP; Anthony Jones

(57) ABSTRACT

Embodiments of the present invention provide a system that replaces an entry in a least-recently-used way in a skewed-associative cache. The system starts by receiving a cache line address. The system then generates two or more indices using the cache line address. Next, the system generates two or more intermediate indices using the two or more indices. The system then uses at least one of the two or more indices or the two or more intermediate indices to perform a lookup in one or more lookup tables, wherein the lookup returns a value which identifies a least-recently-used way. Next, the system replaces the entry in the least-recently-used way.

19 Claims, 5 Drawing Sheets

PSEUDO-LRU CACHE LINE REPLACEMENT FOR A HIGH-SPEED CACHE

RELATED APPLICATIONS

The present application is related to U.S. patent application Ser. No. 11/155,147, filed 16 Jun. 2005, entitled "Circuitry and Method for Accessing an Associative Cache," by inventors Paul Caprioli, Sherman H. Yip, and Shailender Chaudhry.

BACKGROUND

1. Field of the Invention

Embodiments of the present invention relate to techniques for accessing cache memories. More specifically, embodiments of the present invention relate to techniques for identifying a least-recently-used "way" in a set-associative cache memory.

2. Related Art

Almost all computer systems include one or more cache memories, which are small, high-speed memories that store copies of frequently used data items and/or instructions. For example, a typical computer system includes an on-die L1 cache and an on-die or off-die L2 cache which provide two levels of a memory hierarchy that also includes a main memory (e.g., RAM) and a mass-storage device (e.g., a disk drive).

Generally, computer systems first access the L1 cache when attempting to access a given cache line. If the cache line is present in the L1 cache, the cache access is very fast. However, when an attempt to access the cache line misses in the L1 cache, the L1 cache forwards the request to the L2 cache (which may in turn forward the request to the main memory and possibly to the mass-storage device). Because each level of the memory hierarchy has a longer access time than the levels below it, avoiding unnecessary cache misses can improve computer system performance.

One possible way to avoid cache misses is to use a "fully-associative" cache, in which any entry can store cache lines from any address in the next higher level of memory hierarchy. Unfortunately, fully-associative caches are difficult to implement. Because fully associative caches are difficult to implement, computer systems typically use "set-associative" caches. For example, FIG. 1 presents a block diagram illustrating an exemplary set-associative cache 100. The entries in a set-associative cache 100 are logically divided into two or more "ways." For example, in cache 100, the entries are logically divided into four ways. Each way in turn includes entries that are part of one or more "sets." In FIG. 1, an exemplary set in cache 100 is delineated by a group of hash-marked entries. Set-associative caches are well-known in the art and hence are not described in more detail.

Some set-associative caches are "skewed-associative." In a skewed-associative cache, each way in the cache is associated with a hash function that operates on a cache line address to determine which entry in the way is used for the cache line. Note that each hash function can produce a different result for the same cache line address. Consequently, a different entry may be identified for a given cache line address for each way in a skewed-associative cache.

When evicting an entry in a skewed-associative cache, some computer systems use a least-recently-used (LRU) technique to determine which entry is to be replaced. Generally, LRU techniques involve determining which way holds the least-recently-used entry for a cache line and then preferentially replacing the least-recently-used entry.

Each cache in a typical LRU system includes a table (or another data structure) that holds a record of the accesses to the ways within the cache. A given cache uses the table to determine the least-recently-used way in order to replace a cache line in that way. For example, FIG. 2 presents an exemplary LRU search table 200 for a two-way skewed-associative cache (in which the ways are designated "way[0]" and "way[1]"). In FIG. 2, each row in search table 200 represents an entry/index ("index[0]") that can be generated by the hash function for way[0], whereas each column represents an entry/index ("index[1]") that can be generated by the hash function for way[1]. Each table-entry includes a binary flag that indicates whether the least-recently-used entry is in way [0] or way[1]. (For clarity we only show a flag value for the row for index[0] and the column for index[1]).

Unfortunately, the number of entries in the search table for the above-described LRU replacement technique scales exponentially with the number of ways. Consequently, using the LRU replacement technique for a skewed-associative cache with more than a few ways becomes prohibitively expensive (in terms of area, speed, and complexity).

Hence, what is needed is an LRU mechanism without the above-described problems.

SUMMARY

Embodiments of the present invention provide a system that replaces an entry in a least-recently-used way in a skewed-associative cache. The system starts by receiving a cache line address. The system then generates two or more indices using the cache line address. Next, the system generates two or more intermediate indices using the two or more indices. The system then uses at least one of the two or more indices or the two or more intermediate indices to perform a lookup in one or more lookup tables, wherein the lookup returns a value which identifies a least-recently-used way. Next, the system replaces the entry in the least-recently-used way.

In some embodiments, generating each index involves computing the index using a hash function, wherein an input to the hash function is the cache line address.

In some embodiments, generating each intermediate index involves performing one or more logical, mathematical, or bit-level operations to produce the intermediate index using some or all of the bits in one or more of the indices as inputs.

In some embodiments, the skewed-associative cache includes more than two ways and determining a least-recently-used way involves: (1) selecting a final lookup table in a hierarchy of lookup tables using two or more of the intermediate indexes; (2) using a first index to determine a row in the final lookup table; (3) using a second index to determine a column in the final lookup table; and (4) determining a least-recently-used way from an entry where the determined row and column in the final lookup table meet.

In some embodiments, selecting a final lookup table involves, for each level of the hierarchy of lookup tables: (1) using a first intermediate index for the level of the hierarchy to determine a row in the lookup table in the level of hierarchy; (2) using a second intermediate index for the level of the hierarchy to determine a column in the lookup table in the level of hierarchy; and (3) determining a lookup table that is to be used in a next level of the hierarchy from an entry which is located where the determined row and column meet.

In some embodiments, upon accessing an entry in a way, the system uses the two or more intermediate indices and the two or more indices to update each affected lookup table in the hierarchy of lookup tables to indicate that the entry in the way was recently used.

In some embodiments, the skewed-associative cache includes two ways and determining a least-recently-used way involves: (1) using a first index to determine a row in a single lookup table; (2) using a second index to determine a column in the single lookup table; and (3) determining a least-recently-used way from an entry where the determined row and column in the lookup table meet.

In some embodiments, upon accessing an entry in a way, the system uses the two or more indices to update the single lookup table to indicate that the entry in the way was recently used.

DETAILED DESCRIPTION

The following description is presented to enable any person skilled in the art to make and use embodiments of the present invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Computer System

Figure 1:
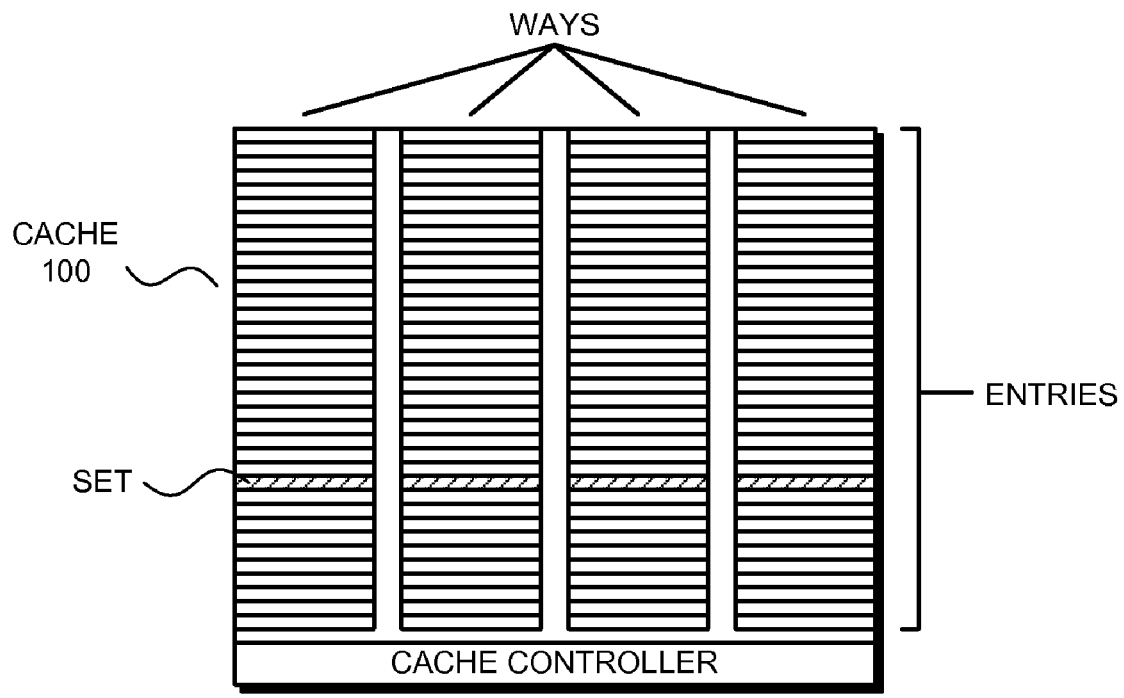
FIG. 1 presents a block diagram illustrating an exemplary set-associative cache.
Figure 2:
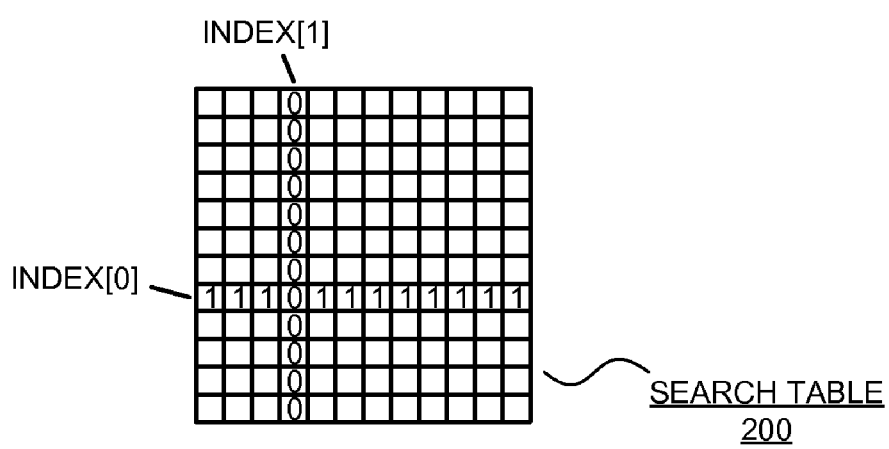
FIG. 2 presents an exemplary LRU search table for a two-way skewed-associative cache.
Figure 3:
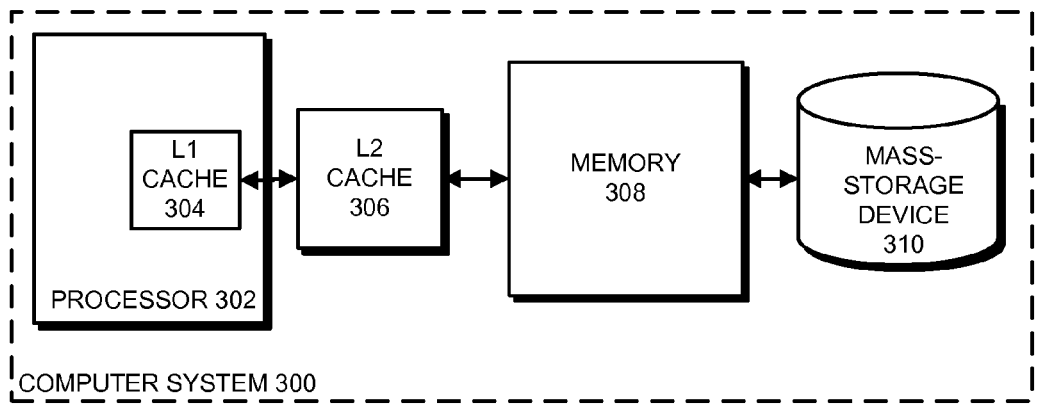
FIG. 3 presents a block diagram of a computer system in accordance with embodiments of the present invention.

FIG. 3 presents a block diagram of a computer system 300 in accordance with embodiments of the present invention. Computer system 300 includes processor 302, L2 cache 306, memory 308, and mass-storage device 310.

Processor 302 is a general-purpose processor that performs computational operations. For example, processor 302 can be a central processing unit (CPU) such as a microprocessor. On the other hand, processor 302 can be a controller or an application-specific integrated circuit. Processor 302 includes L1 cache 304. (In some embodiments of the present invention, L2 cache 306 is included in processor 302.)

Mass-storage device 310, memory 308, L2 cache 306, and L1 cache 304 collectively form a memory hierarchy that stores data and instructions for processor 302. Generally, mass-storage device 310 is a high-capacity memory, such as a disk drive or a large flash memory, with a large access time, while L1 cache 304, L2 cache 306, and memory 308 are smaller, faster semiconductor memories that store copies of frequently used data. Memory 308 is typically a dynamic random access memory (DRAM) structure that is larger than L1 cache 304 and L2 cache 306, whereas L1 cache 304 and L2 cache 306 are typically comprised of smaller static random access memories (SRAM). In some embodiments of the present invention, L2 cache 306, memory 308, and mass-storage device 310 are shared between one or more processors in computer system 300. Such memory structures are well-known in the art and are therefore not described in more detail.

Although we use specific components to describe computer system 300, in alternative embodiments different components can be present in computer system 300. For example, computer system 300 can include video cards, network cards, optical drives, and/or other peripheral devices that are coupled to processor 302 using a bus, a network, or another suitable communication channel. Alternatively, computer system 300 may include one or more additional processors, wherein the processors share some or all of L2 cache 306, memory 308, and mass-storage device 310.

Computer system 300 can be used in many different types of electronic devices. For example, computer system 300 can be part of a desktop computer, a laptop computer, a server, a media player, an appliance, a cellular phone, a piece of testing equipment, a network appliance, a calculator, a personal digital assistant (PDA), a hybrid device (i.e., a "smart phone"), a guidance system, an automotive control system, or another electronic device.

Caches

Starting from mass-storage device 310 and proceeding to L1 cache 304 (right to left in FIG. 3), at each level of the memory hierarchy, the number of entries for storing data is smaller than the number of entries at the next higher level. For example, assuming 64-byte cache lines, L1 cache 304 may provide 128 KB, or 256 entries, while L2 cache 306 provides 2 MB, or 4096 entries, memory 308 provides 8 GB, or approximately 16 million entries, and mass-storage device 310 provides hundreds of GBs or TBs of storage, providing a proportional number of entries. Because L1 cache 304 and L2 cache 306 each have a smaller number of entries than the level of the memory hierarchy above them, each entry is available to store data from more than one entry (e.g., cache line) in the higher level. For example, assuming the above-described cache sizes, each entry in L1 cache 304 is available to store cache lines from 16 addresses in L2 cache 306.

In embodiments of the present invention, the some or all of the caches are "set-associative." Generally, in a set-associative cache, the entries in the cache are logically divided into a number of "sets" and "ways." A "set" is a group of cache entries that are used to store cache lines from the same predetermined range of addresses. For example, one set in L1 cache 304 may include four entries that are used to hold cache lines from 64 cache lines in L2 cache 306. A "way" is a logical division of the entries in the cache into two or more similar groups. For example, L1 cache 304 can be divided into four ways, where each way includes 64 entries.

Some embodiments of the present invention use a function (a "hash function" or "hashing scheme") to identify an entry within a given way for a specific cache line. Generally, the hash function takes an incoming cache line address as input and returns an entry identifier. More specifically, the hash function performs bit-level, logical, or mathematical operations on some or all of the bits in the incoming cache line address to produce an entry identifier. For example, the hash function can extract some of the bits in the incoming address and use these bits as the address of the entry.

In some embodiments of the present invention, some or all of the caches are "skewed-associative." Generally, in a skewed-associative cache, two or more different hash functions are used to identify entries for two or more associated ways when accessing a cache line. In some embodiments, each hash function is associated with only one way. In other embodiments, each hash function may be associated with two or more ways (although no way is associated with more than one hash function). For example, in a 2-way skewed-associative cache, hash_function[0] may be associated with one way, while hash_function[1] is associated with the other way. Alternatively, in a 4-way skewed-associative cache, hash_function[0] can be associated with three ways, while hash_function[1] is associated with the fourth way.

In embodiments of the present invention, the entry identified by each hash function may not correspond with the entry (ies) identified by the other hash function(s). For example, given two hash functions, the first hash function may return entry "2" for a given address while the second hash function returns entry "16" for the same address.

Pseudo-LRU Replacement

Embodiments of the present invention use a pseudo-least-recently-used (pseudo-LRU) technique to identify a way in a skewed-associative cache with an entry that is to be replaced with a new cache line. Generally, in embodiments of the present invention, using the pseudo-LRU technique involves looking up a least-recently-used way using one or more lookup tables that hold a record of the accesses to ways in the cache. For example, in some embodiments of the present invention, the search can involve searching for the least-recently-used way in a hierarchical arrangement of lookup tables.

In embodiments of the present invention, the number of lookup tables searched during a pseudo-LRU lookup is dependent on the number of ways in the skewed-associative cache. More specifically, the lookup is performed using M−1 lookup tables, where M is the number of ways.

For example, assuming a 2-way skewed-associative cache (i.e., where the skewed-associative cache includes way[0] and way[1]), the lookup is performed using a single lookup table. In this case, a result determined using a hash function associated with way[0] ("hash_function[0]") is used as the index ("index[0]") for a row within the lookup table, whereas a result determined using a hash function associated with way[1] ("hash_function[1]") is used as the index ("index[1]") for a column within the lookup table. The entry in the lookup table where the determined row and column meet contains an indicator of which of the ways includes the least-recently-used entry. For example, the entry in the lookup table can contain a binary value, wherein a "0" indicates that way[1] is the least recently used way, or a "1" indicates that way[0] is the least recently used way.

On the other hand, in embodiments with more than 2 ways, the lookup is performed using a hierarchy of 2 or more lookup tables. In this case, a top-level lookup table serves as a "root" table in the hierarchy of lookup tables. With the exception of the final level of hierarchy, each table in the hierarchy includes an identifier for a next table to access during a lookup. In the final level of hierarchy, each lookup table indicates which of two associated ways contains the LRU entry. The process of using a hierarchy of lookup tables is described in more detail in the following examples.

Figure 4:
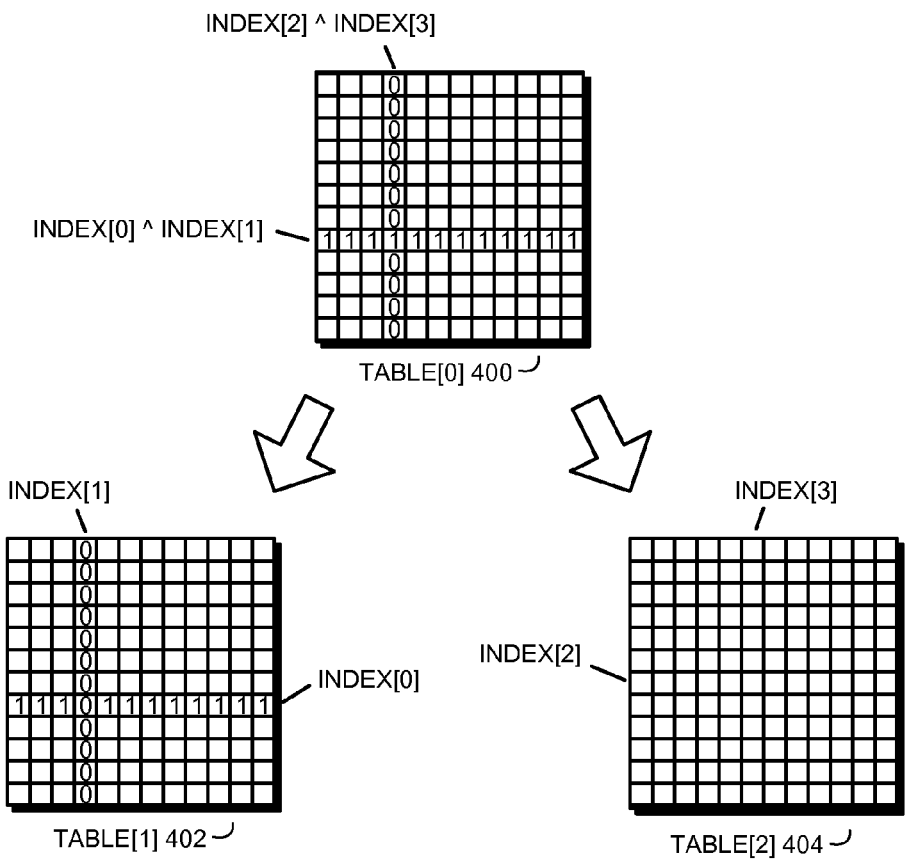
FIG. 4 presents a block diagram of a set of pseudo-LRU lookup tables in accordance with embodiments of the present invention.

FIG. 4 presents a block diagram of a set of pseudo-LRU lookup tables in accordance with embodiments of the present invention. For the purposes of illustration, we describe three LRU lookup tables (i.e., table[0] 400-table[2] 404) for a 4-way skewed-associative cache (M=4) (not shown). Each way in the cache includes N entries. Hence, the LRU lookup tables include N rows and N columns, or N*N entries. During a lookup, embodiments of the present invention function as follows.

For each way[i] in a skewed-associative cache where i={0, 1,2,3}, when replacing a cache line, an entry within the way is identified using an associated hash function (i.e., hash_function[i], where i={0,1,2,3}). The results from the hash functions are also used to generate indices for lookups in the LRU lookup tables. For example, the result from hash_function[0] can be used to generate index[0].

As shown in FIG. 4, the lookup tables for a 4-way skewed-associative cache are arranged in a two-level hierarchy. In the first ("root") level, the index for each row is generated using (index[0] ^ index[1]) and the index for each column is generated using (index[2] ^ index[3]). In the second level, within table[1] 402, the row is indexed using index[0] and the column using index[1], whereas within table[2] 404, the row is indexed using index[2] and the column using index[3]. Note that "^" represents the logical XOR operation. Moreover, the combined index generated during the XOR operation is interchangeably called an "intermediate index."

During operation, when replacing a cache line (i.e., evicting an existing copy of a cache line and writing new data into the entry), embodiments of the present invention identify a way in which to replace an entry according to the formula:

(table[0][index[0] ^ index[1]][index[2] ^ index[3]]==0)?table[1][index[0]][index[1]]:table[2][index[2]][index[3]]), where the "?" is a well-known ternary operator that determines a value for a corresponding entry in table[0] 400 and, based on that value, returns the value of an entry in one of table[1] 402 or table[2] 404. As described above, the entry in table[1] 402 indicates whether or not way[0] or way[1] is the least-recently-used way, whereas the entry in table[2] 404 indicates whether way[2] or way[3] is the least-recently-used way.

On the other hand, when a way is accessed ("used") during an operation, embodiments of the present invention update the hierarchy of tables to reflect the most recently used way. The updates are propagated through the affected tables in the hierarchy to the lowest-level table. For example, upon detecting a hit to way[0] or way[1], these embodiments update table[0] 400 (i.e., the "root" table) by setting each entry of row (index[0] ^ index[1]) in table[0] 400 to 1. Then, if the hit was in way[0], each entry of the row associated with index[0] in table[1] 402 is updated to 1. Alternatively, if the hit was in way[1], each entry of the column associated with index[1] in table[1] 402 is updated to 0. Note that in these embodiments, the values are set according to the most-recently-used way and embodiments of the present invention use the opposing value when searching the lookup tables and/or making the way determination in the final level of hierarchy. In alternative embodiments, the entries in the lookup table are updated with the least-recently-used way.

On the other hand, upon detecting a hit to way[2] or way[3], these embodiments update table[0] 400 by setting each entry of column (index[2] ^ index[3]) to 0. Then, if the if the hit was in way[2], each entry of the row associated with index[2] in table[2] 404 is updated to 1. Alternatively, if the hit was in way[3], each entry of the column associated with index[3] in table[2] 404 is updated to 0.

Although we describe embodiments of the present invention that use the logical XOR operation to generate indices, alternative embodiments of the present invention use other operations to generate the indices. For example, other embodiments can combine the separate indices into an intermediate index using operations such as interleaving or prepending/appending some or all of each index to the other index (or indices). Moreover, these embodiments can use one or more mathematical operations, logical operations, or other operations to generate the intermediate indices.

Figure 5:
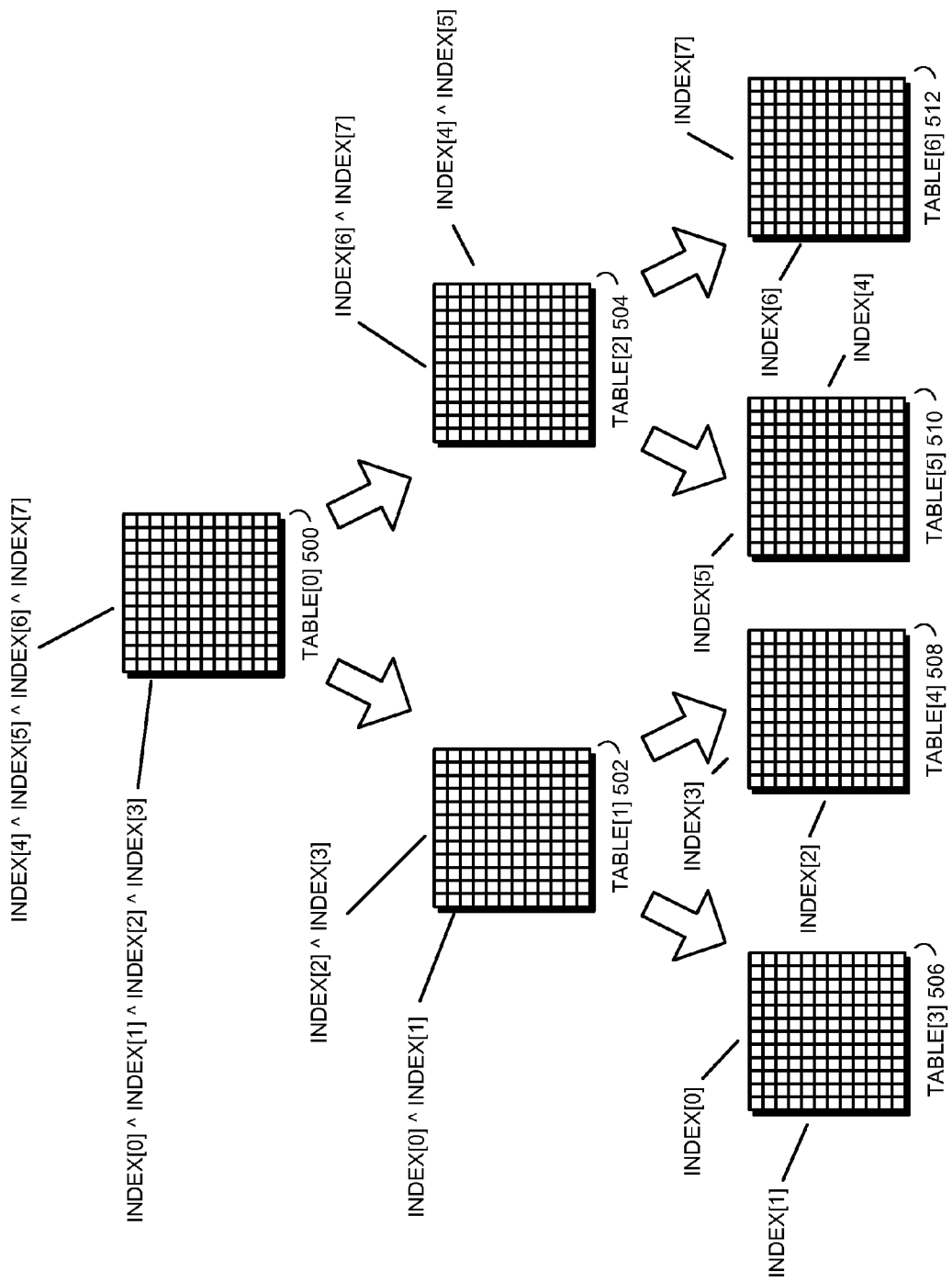
FIG. 5 presents a block diagram of a set of pseudo-LRU lookup tables in accordance with embodiments of the present invention.

FIG. 5 presents a block diagram of a set of pseudo-LRU lookup tables in accordance with embodiments of the present invention. The pseudo-LRU lookup tables in FIG. 5 are used with an 8-way skewed-associative cache and include table[0] 500-table[6] 512. Like the lookup tables in FIG. 4, the rows and columns of the lookup tables are indexed using the results from the hash_function[i] associated with each way, where i={0,1,2,3,4,5,6,7,8}. For example, in table[0] 500 (the "root" table), the index (intermediate index) for each column is generated using (index[0] ^ index[1] ^ index[2] ^ index[3]), whereas the index for each row is generated using (index[4] ^ index[5] ^ index[6] ^ index[7]). On the other hand, in an exemplary table[2] 504, the index for each column is generated using (index[4] ^ index[5]), while the index for each row is generated using (index[6] ^ index[7]). In an exemplary final level of hierarchy, in table[6] 512, the index for each column is index[6], while the index for each row is index[7]. Table[6] 512 provides LRU information for way[6] and way[7], while the remaining tables (i.e., table[0] 500-table[5] 510) in the final level of the hierarchy provide LRU information for the remaining ways.

In some embodiments of the present invention, the number of unique hash functions (i.e., the skewing) is smaller than the number of ways. For example, a 4-way skewed-associative cache can be skewed only two ways by setting index[2]==index[0] and index[3]==index[1]. The arrangement of lookup tables for these embodiments is similar to the arrangements of the tables in FIG. 4. In this case, table[0] 400 is indexed using index[0] for the row and index[1] for the column (i.e., without the logical XOR), while table[1] 402 and table[2] 404 include Nbits (rather than N*N bits as shown in FIG. 4).

In some embodiments of the present invention, the number of ways in the cache is not an even number nor a power of two, for example a 3-way or 6-way cache can be used in some embodiments of the present invention. Although the hierarchy of lookup tables may be slightly different in these embodiments, the LRU replacement technique is otherwise the same as with a number of ways that is a power of two. For example, for a 3-way cache only two N*N lookup tables are needed because one of the table entries in the root table can identify: (1) a least-recently-used way directly or (2) the other table (which in turn indicates which of the two remaining ways is the least-recently-used).

Note that although we describe embodiments of the present invention that use a pseudo-LRU replacement technique, other embodiments can operate with other replacement techniques. For example, embodiments of the present invention operate using a most-recently-used (MRU) technique or a most-frequently used (MFU) technique.

As described in the preceding paragraphs, assuming an M-way skewed-associative cache having N entries per way, embodiments of the present invention maintain pseudo-LRU replacement information for the cache using (M−1)*N*N bits of data. Hence, in these embodiments, the amount of replacement information (i.e., the total number of entries in the LRU lookup tables) scales linearly with the number of ways, M. Because the amount of replacement information in embodiments of the present invention scales linearly with the number of ways, these embodiments have reduced complexity and require less area and power in comparison with existing systems.

LRU-Replacement Process

Figure 6:
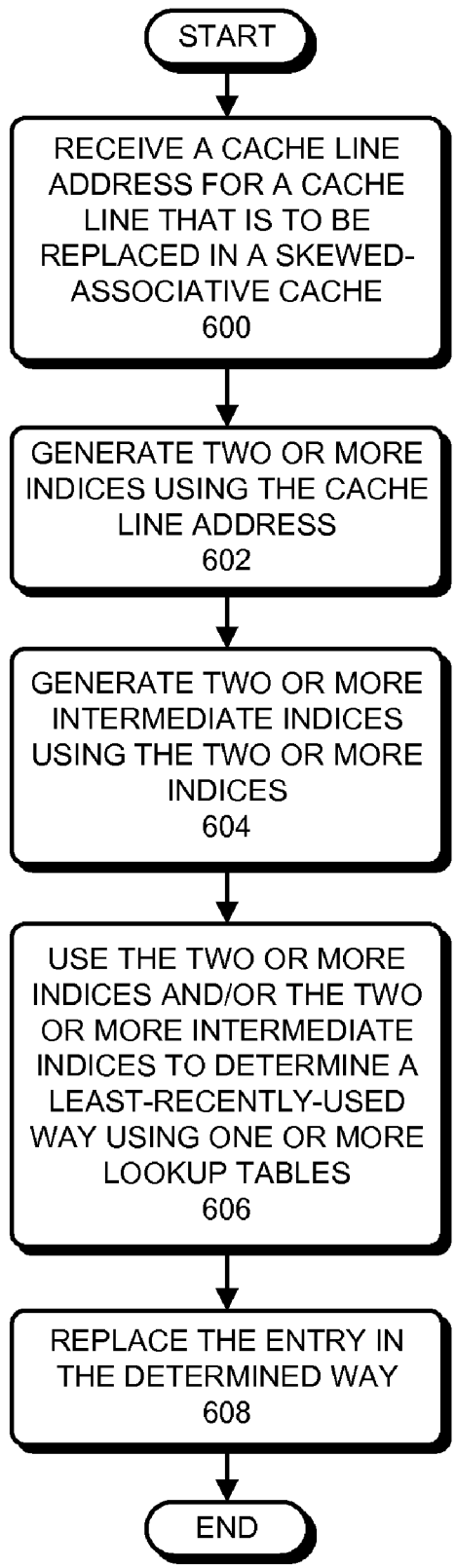
FIG. 6 presents a flowchart illustrating a process for replacing a least-recently-used entry in a skewed-associative cache in accordance with embodiments of the present invention.

FIG. 6 presents a flowchart illustrating a process for replacing a least-recently-used entry in a skewed-associative cache in accordance with embodiments of the present invention. In embodiments of the present invention, the process can be performed in a cache controller in the cache, a circuit coupled to the cache, or in another device or combination of devices. For clarity we describe embodiments of the present invention where the process is performed by a system.

The process starts when the system receives a cache line address for a cache line that is to be replaced in a skewed-associative cache (step 600). The system then generates two or more indices using the cache line address (step 602). For example, the system can generate two or more separate indices using two or more hash functions.

The system then generates two or more intermediate indices using the two or more indices (step 604). When generating each intermediate index, the system takes one or more of the indices generated in step 602 as input(s) and performs one or more logical, mathematical, or bit-level operations to produce the intermediate index. For example, the system can logically XOR two or more of the indices generated in step 602 to form an intermediate index. Alternatively, the system can perform a summation, multiplication, or algebraic operation; a bit-level combination (e.g., shifting, prepending/appending, interleaving, etc.) of some or all of the bits of one index with some or all of the bits of another index (or indices); or another operation to form an intermediate index.

The system then uses the two intermediate indices and/or the two or more indices to identify a least-recently-used way in the cache using one or more lookup tables (step 606). For example, given a 4-way skewed-associative cache (see FIG. 4), the system can look up the least-recently-used way by: (1) using two intermediate indices (e.g., "index[0] ^ index[1]" and "index[2] ^ index[3]") to look up in table[0] 400 which of table[1] 402 and table[2] 404 holds the indicator of the least-recently-used way and (2) using two indices (e.g., "index[0]" and "index[1]" or "index[2]" and "index[3]") to look up the least-recently-used way in table[1] 402 or table[2] 404.

The system then replaces the entry in the identified way (step 608). In other words, the system evicts the entry in the least-recently-used way (as identified in step 606) in the cache and then replaces the evicted entry. In some embodiments of the present invention, the identity of the way is stored in a register or another memory location during step 606 and is read during step 608.

LRU Determination Mechanism

Figure 7:
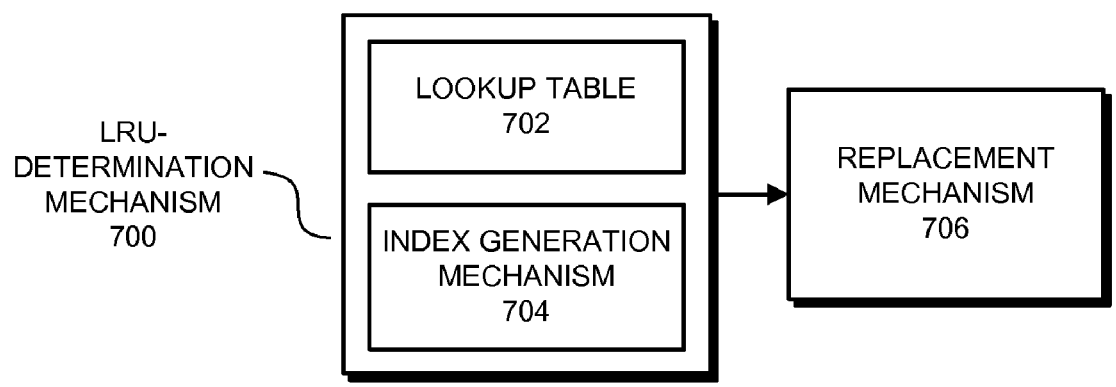
FIG. 7 presents a block diagram illustrating an exemplary least-recently-used (LRU) determination mechanism in accordance with embodiments of the present invention.

FIG. 7 presents a least-recently-used (LRU) determination mechanism 700 in accordance with embodiments of the present invention. LRU determination mechanism 700 is associated with one or more caches in computer system 300. For a given cache and cache line address, LRU determination mechanism 700 identifies which way in the cache contains the least-recently-used entry for the cache line address. In some embodiments of the present invention, LRU determination mechanism 700 is included as part of a given cache and services only that cache. For example, LRU determination mechanism 700 can be included as part of a cache controller. In alternative embodiments, LRU determination mechanism 700 is a separate structure that services one or more caches. For example, LRU determination mechanism 700 can be a processor or an application-specific integrated circuit (ASIC).

LRU determination mechanism 700 includes lookup table 702 and index-generation mechanism 704. Lookup table 702 is a memory structure that includes one or more lookup tables for each associated cache that identify a least-recently-used way within the cache. Index generation-mechanism 704 is a circuit structure that generates one or more indices and/or intermediate indices for performing lookups in lookup table 702.

LRU-determination mechanism 700 is configured to communicate the identity of the least-recently-used way to replacement mechanism 706, which replaces the entry in the least-recently-used way. Replacement mechanism 706 can be a cache controller, a processor, an ASIC, or another such mechanism that is associated with a given cache.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for replacing an entry in a least-recently-used way in a skewed-associative cache, comprising:
    receiving a cache line address;
    generating two or more indices using the cache line address, wherein generating each index involves computing the index using a hash function for which an input is the cache line address, wherein a different hash function is used to compute an index for each way for each of the two or more indices in the skewed-associative cache;
    generating two or more intermediate indices using the two or more indices;
    using at least one of the two or more indices or the two or more intermediate indices to perform a lookup in one or more lookup tables, wherein the lookup returns a value which identifies a least-recently-used way; and
    replacing the entry in the least-recently-used way.

2. The method of claim 1, wherein generating each intermediate index involves performing one or more logical, mathematical, or bit-level operations to produce the intermediate index using some or all of the bits in one or more of the indices as inputs.

3. The method of claim 1, wherein the skewed-associative cache includes more than two ways and determining a least-recently-used way involves:
    selecting a final lookup table in a hierarchy of lookup tables using two or more of the intermediate indexes;
    using a first index to determine a row in the final lookup table;
    using a second index to determine a column in the final lookup table; and
    determining a least-recently-used way from an entry where the determined row and column in the final lookup table meet.

4. The method of claim 3, wherein selecting a final lookup table involves, for each level of the hierarchy of lookup tables:
    using a first intermediate index for the level of the hierarchy to determine a row in the lookup table in the level of hierarchy;
    using a second intermediate index for the level of the hierarchy to determine a column in the lookup table in the level of hierarchy; and
    determining a lookup table that is to be used in a next level of the hierarchy from an entry which is located where the determined row and column meet.

5. The method of claim 3, upon accessing an entry in a way, the method further comprises using the two or more intermediate indices and the two or more indices to update each affected lookup table in the hierarchy of lookup tables to indicate that the entry in the way was recently used.

6. The method of claim 1, wherein the skewed-associative cache includes two ways and determining a least-recently-used way involves:
    using a first index to determine a row in a single lookup table;
    using a second index to determine a column in the single lookup table; and
    determining a least-recently-used way from an entry where the determined row and column in the single lookup table meet.

7. The method of claim 6, upon accessing an entry in a way, the method further comprises using the two or more indices to update the single lookup table to indicate that the entry in the way was recently used.

8. An apparatus for replacing an entry in a least-recently-used way in a skewed-associative cache, comprising:
    a least-recently-used (LRU) determination mechanism, wherein the LRU determination mechanism includes one or more lookup tables for identifying a least-recently-used way, wherein the LRU determination mechanism is configured to:
    receive a cache line address;
    generate two or more indices using the cache line address, wherein generating each index involves computing the index using a hash function for which an input is the cache line address, wherein a different hash function is used to compute an index for each way for each of the two or more indices in the skewed-associative cache;
    generate two or more intermediate indices using the two or more indices;
    use at least one of the two or more indices or the two or more intermediate indices to perform a lookup in the one or more lookup tables, wherein the lookup returns a value which identifies a least-recently-used way; and
    a replacement mechanism configured to replace the entry in the identified least-recently-used way.

9. The apparatus of claim 8, wherein when generating each intermediate index, the LRU-determination mechanism is configured to perform one or more logical, mathematical, or bit-level operations to produce the intermediate index using some or all of the bits in one or more of the indices as inputs.

10. The apparatus of claim 8, wherein the skewed-associative cache includes more than two ways and the LRU-determination mechanism is configured to identify a least-recently-used way by:
    selecting a final lookup table in a hierarchy of lookup tables using two or more of the intermediate indexes;
    using a first index to determine a row in the final lookup table;
    using a second index to determine a column in the final lookup table; and
    determining a least-recently-used way from an entry where the determined row and column in the final lookup table meet.

11. The apparatus of claim 10, wherein when selecting a final lookup table, for each level of the hierarchy of lookup tables, the LRU-determination mechanism is configured to:
    use a first intermediate index for the level of the hierarchy to determine a row in the lookup table in the level of hierarchy;
    use a second intermediate index for the level of the hierarchy to determine a column in the lookup table in the level of hierarchy; and determine a lookup table that is to be used in a next level of the hierarchy from an entry which is located where the determined row and column meet.

12. The apparatus of claim 10, wherein when an entry in a way has been accessed, the LRU-determination mechanism is configured to use the two or more intermediate indices and the two or more indices to update each affected lookup table in the hierarchy of lookup tables to indicate that the entry in the way was recently used.

13. The apparatus of claim 8, wherein the skewed-associative cache includes two ways and the LRU-determination mechanism is configured to identify a least-recently-used way by:
using a first index to determine a row in a single lookup table;
using a second index to determine a column in the single lookup table; and
determining a least-recently-used way from an entry where the determined row and column in the single lookup table meet.

14. The apparatus of claim 13, wherein when an entry in a way has been accessed, the LRU-determination mechanism is configured to use the two or more indices to update the single lookup table to indicate that the entry in the way was recently used.

15. A computer system for replacing an entry in a least-recently-used way in a skewed-associative cache, comprising:
a processor coupled to the skewed-associative cache, wherein the skewed-associative cache stores data for the processor;
a least-recently-used (LRU) determination mechanism, wherein the LRU determination mechanism includes one or more lookup tables for identifying a least-recently-used way, wherein the LRU determination mechanism is configured to:
receive a cache line address;
generate two or more indices using the cache line address, wherein generating each index involves computing the index using a hash function for which an input is the cache line address, wherein a different hash function is used to compute an index for each way for each of the two or more indices in the skewed-associative cache;
generate two or more intermediate indices using the two or more indices;
use at least one of the two or more indices or the two or more intermediate indices to perform a lookup in the one or more lookup tables, wherein the lookup returns a value which identifies a least-recently-used way; and
a replacement mechanism configured to replace the entry in the identified least-recently-used way.

16. The computer system of claim 15, wherein when generating each intermediate index, the LRU-determination mechanism is configured to perform one or more logical, mathematical, or bit-level operations to produce the intermediate index using some or all of the bits in one or more of the indices as inputs.

17. The computer system of claim 15, wherein the skewed-associative cache includes more than two ways and the LRU-determination mechanism is configured to identify a least-recently-used way by:
selecting a final lookup table in a hierarchy of lookup tables using two or more of the intermediate indexes;
using a first index to determine a row in the final lookup table;
using a second index to determine a column in the final lookup table; and
determining a least-recently-used way from an entry where the determined row and column in the final lookup table meet.

18. The computer system of claim 17, wherein when selecting a final lookup table, for each level of the hierarchy of lookup tables, the LRU-determination mechanism is configured to:
use a first intermediate index for the level of the hierarchy to determine a row in the lookup table in the level of hierarchy;
use a second intermediate index for the level of the hierarchy to determine a column in the lookup table in the level of hierarchy; and
determine a lookup table that is to be used in a next level of the hierarchy from an entry which is located where the determined row and column meet.

19. The computer system of claim 17, wherein when an entry in a way has been accessed, the LRU-determination mechanism is configured to use the two or more intermediate indices and the two or more indices to update each affected lookup table in the hierarchy of lookup tables to indicate that the entry in the way was recently used.

* * * * *